(12) United States Patent
Limoge et al.

(10) Patent No.: US 6,259,170 B1
(45) Date of Patent: Jul. 10, 2001

(54) BI-COLOR LED TRAILER CONNECTOR CIRCUIT PROTECTOR AND INDICATOR

(75) Inventors: Henry J. Limoge, San Jose; Richard Bryant, San Dimas, both of CA (US); Richard Johnson, Tecumseh, MI (US)

(73) Assignee: Draw-Tite, Inc., Canton, MI (US)

( * ) Notice: Subject to any disclaimer, the term of this patent is extended or adjusted under 35 U.S.C. 154(b) by 0 days.

(21) Appl. No.: 09/330,627

(22) Filed: Jun. 11, 1999

Related U.S. Application Data
(60) Provisional application No. 60/089,307, filed on Jun. 15, 1998.

(51) Int. Cl.$^7$ ................................................ B60L 1/14
(52) U.S. Cl. ..................... 307/10.8; 307/10.1; 439/490
(58) Field of Search ................... 307/10.1, 10.8; 439/35, 490; 324/504; 340/431, 475; 315/77, 82

(56) References Cited

U.S. PATENT DOCUMENTS

| | | | |
|---|---|---|---|
| 4,057,310 | * 11/1977 | Young ........................ | 339/10 |
| 5,052,951 | 10/1991 | Johnson . | |
| 5,442,332 | * 8/1995 | Hughes ........................ | 340/467 |
| 5,498,910 | * 3/1996 | Hopkins et al. ............. | 307/10.1 |
| 5,604,439 | * 2/1997 | Walkington et al. ........ | 324/504 |
| 5,936,407 | * 8/1999 | Borland ....................... | 324/504 |
| 6,177,865 | * 1/2001 | Bryant et al. ............... | 340/431 |

OTHER PUBLICATIONS

Short Stop packaging and illustration dated ©1997—plus in circuit breaker for trailer wiring.
U–haul traier wiring harness packaging dated Feb. 1996—4–way flat piggy plugs with 60' lead.

\* cited by examiner

*Primary Examiner*—Josie Ballato
*Assistant Examiner*—Sharon Polk
(74) *Attorney, Agent, or Firm*—Leon E. Redman; Lloyd D. Doigan

(57) ABSTRACT

An electrical trailer plug device for connecting a trailer electrical system to a tow vehicle electrical system. The trailer plug device includes a first electrical connector configured to connect an electrical current path of the vehicle electrical system to an electrical current path of the trailer electrical system to complete an electrical circuit supplying electricity from the vehicle electrical system to one or more trailer lamps supported on the trailer. The device also includes a current protection device configured to limit current in the circuit when current flow in the circuit exceeds a predetermined value. A first sensor light is connected in the circuit with a combination of circuit elements configured to illuminate the first sensor light when current is flowing in the circuit but has not exceeded the predetermined. A second sensor light may be connected in the circuit with a combination of circuit elements configured to illuminate the second sensor light when the current protection device is limiting current flow in the circuit.

15 Claims, 3 Drawing Sheets

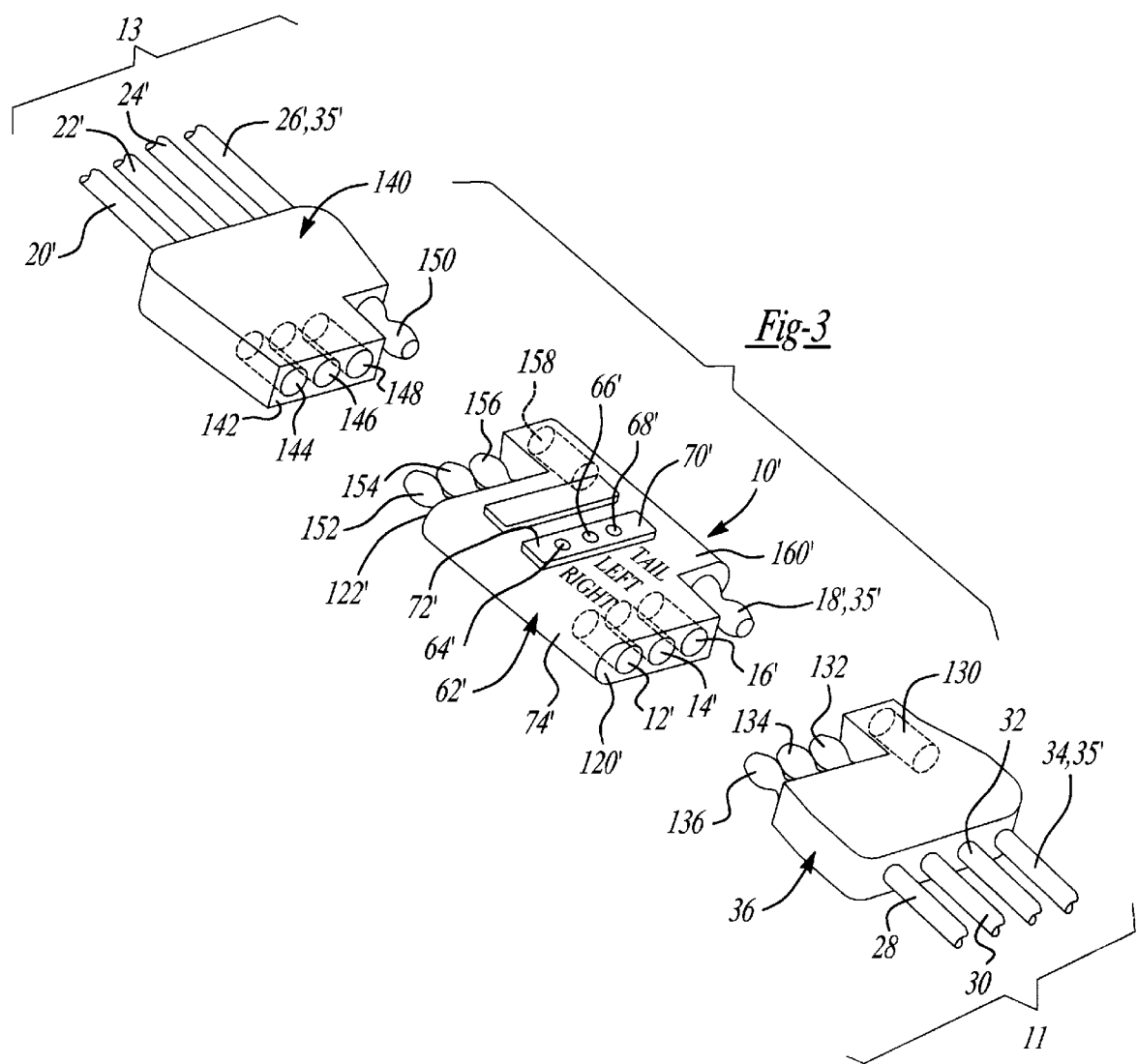

BI-COLOR LED TRAILER CONNECTOR CIRCUIT PROTECTOR AND INDICATOR

Figure 1:
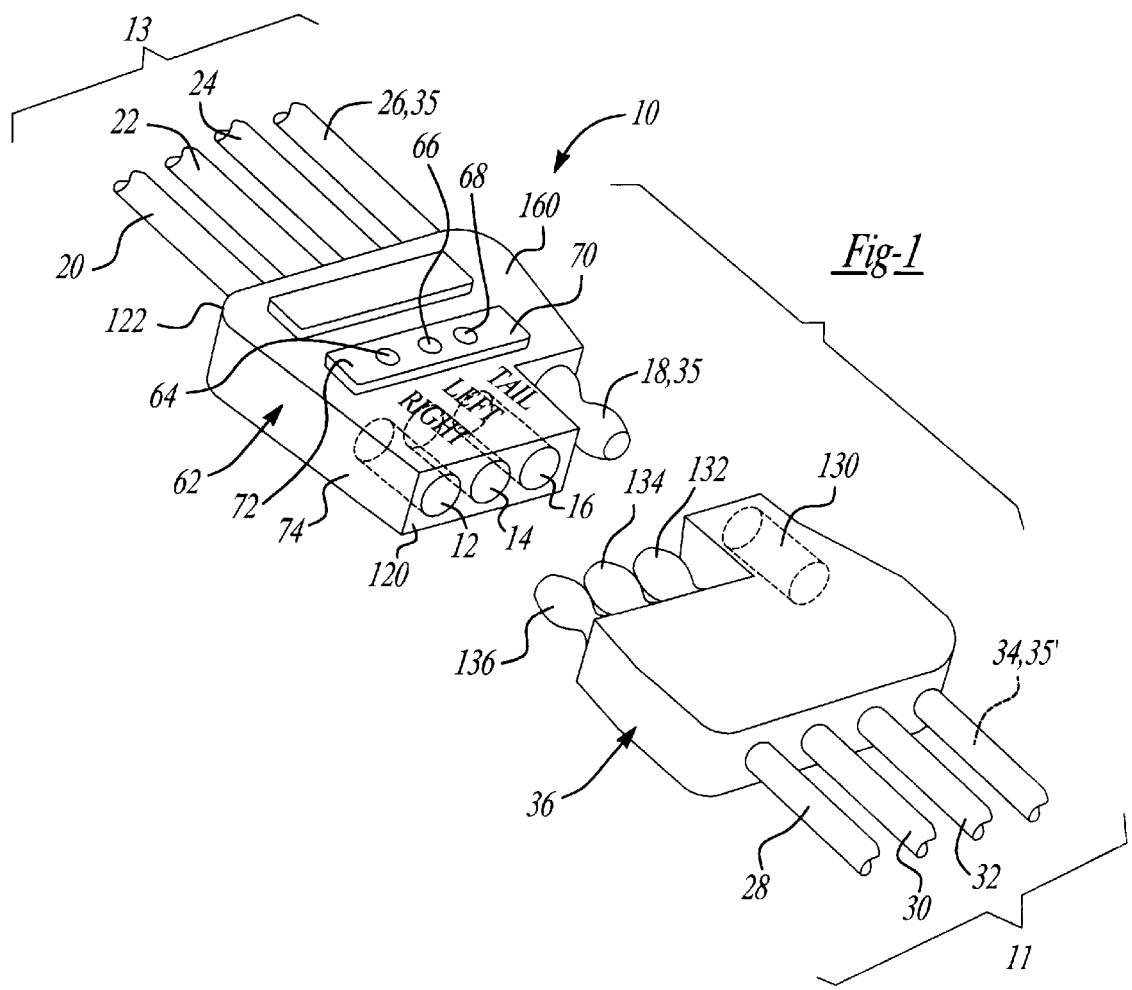

This application claims priority of U.S. provisional patent application No. 60/089,307 filed Jun. 15, 1998.

TECHNICAL FIELD OF THE INVENTION

This invention relates generally to an electrical connector and, more particularly, to an electrical plug for connecting a tow vehicle electrical system wires to a trailer electrical system wires.

INVENTION BACKGROUND

Trailers configured to be towed behind automotive vehicles typically include trailer electrical systems that include lights, wiring and a trailer electrical plug. The lights are generally mounted on or near a rear portion of the trailers they are mounted on. The lights include left and right turn signal lights, and left and right taillights. Each light normally includes an incandescent lamp and a socket configured to receive the incandescent lamp. The wires extend from the light sockets to the trailer electrical plug. A standard type of plug used in such electrical systems is known as a "four-flat" trailer wiring plug and is configured to plug into a complementary vehicle electrical plug mounted on a tow vehicle. When joined together, the trailer and vehicle plugs connect tow vehicle electrical system wires to the trailer electrical system wires, which transmits power from vehicle lighting circuits to the trailer electrical system to illuminate the trailer lights.

Each trailer electrical plug typically includes four electrical connectors. One of these four connectors is connected to a chassis ground wire that connects to a chassis ground lead from each light through the trailer chassis. Another of the four connectors is connected to a wire that extends and connects to the left turn signal light. A third of the four connectors is connected to a wire that extends and connects to the right turn signal light. The remaining connector is connected to a wire that extends to both the left and right taillights.

The four connectors of the trailer plug generally include one female and three male connectors encased in a parallel disposition in a plastic jacket or casing. Similarly, the vehicle plug includes four connectors encased in a plastic jacket. However, the four connectors of the vehicle plug generally include one male and three female connectors to complement the one female and three male connectors of the trailer plug. The one female trailer plug connector and the one male vehicle plug connector are conventionally the chassis ground connection. The other three connectors are conventionally, in order from the ground connectors, the tail light connectors and the left and right turn signal light connectors. This convention insures that the correct contacts are made between taillight and turn signal light circuits whenever a trailer electrical system is connected to a tow vehicle electrical system.

Trailer electrical systems are also known to include circuit breakers. The circuit breakers are configured to open circuits that are shorted or supplied with an excessive amount of electrical current. The circuit breakers must then be reset before the circuit can be closed after a fault has been corrected. Some trailer electrical systems also include sensor lights that illuminate when a given circuit is closed and extinguish when the circuit is opened.

In the electrical arts, it is known to employ polymeric positive temperature coefficient resettable fuses (PTC devices) that use conductive-polymer technology to limit the flow of dangerously high current during fault conditions. These are solid-state devices configured to reset after a fault is cleared and power to the circuit is removed.

Also known in the electrical arts are bi-color light-emitting diodes (LED's), each of which includes two monochromatic light sources. Each monochromatic light source includes a tiny chip that generates a very narrow band of electromagnetic energy in the visible spectrum, i.e., colored light. The two chips are encased in a single epoxy lens, which may also be colored.

What is needed is a trailer electrical system circuit protection and fault indication system that is readily observable and understandable and that is self-resetting.

INVENTION SUMMARY

In accordance with this invention an electrical trailer plug device is provided that includes at least one electrical connector configured to connect an electrical current path of a vehicle electrical system to an electrical current path of a trailer electrical system to complete an electrical circuit supplying electricity from the vehicle electrical system to a lamp supported on the trailer. A circuit protection device in the form of a circuit breaker or fuse is connected in the circuit between at least one of the connectors and a lamp connected in the circuit. The circuit protection device is configured to limit current flow in the circuit when the current exceeds a predetermined value. The device includes a first sensor light and is configured to illuminate the first sensor light when current is flowing in the circuit but has not exceeded the predetermined value. The device may also include a second sensor light and be configured to illuminate the second sensor light when the circuit protection device is limiting current flow in the circuit in response to a fault in the circuit.

Other aspects of the invention include a plug device that includes three sets of connectors, circuit protection devices and lights along with a third connector serving to provide a common ground connection. The four connectors complete three electrical circuits that supply electricity from the vehicle electrical system to four trailer lamps supported on the trailer.

Other aspects of the invention also include a single bi-color light-emitting diode (LED) comprising the two sensor lights in each circuit, and the circuit protection devices comprising polymeric positive temperature coefficient (PTC) resettable fuses.

Another aspect of the invention is that the three bi-color LED's are encapsulated into a one-piece translucent cast acrylic block that is inserted as a single piece into the device. This provides simplified assembly over the installation of six separate "loose piece" LED's. This one-piece construction also promotes a superior moisture seal when the components are overmolded into a plug casing. The moisture seal is superior because only one component (the block) protrudes from the surface of the plug casing.

Other objects, features and advantages of this invention include the provision of a trailer plug that includes components that help identify trailer electrical problems such as shorts in the wiring or excessive loads, that can identify a problem in the towing vehicle electrical system, that protect the towing vehicle wiring against shorts or overloads in a trailer electrical system and that is constructed in such a way as to be resistant to moisture damage.

BRIEF DRAWING DESCRIPTION

Figure 2:
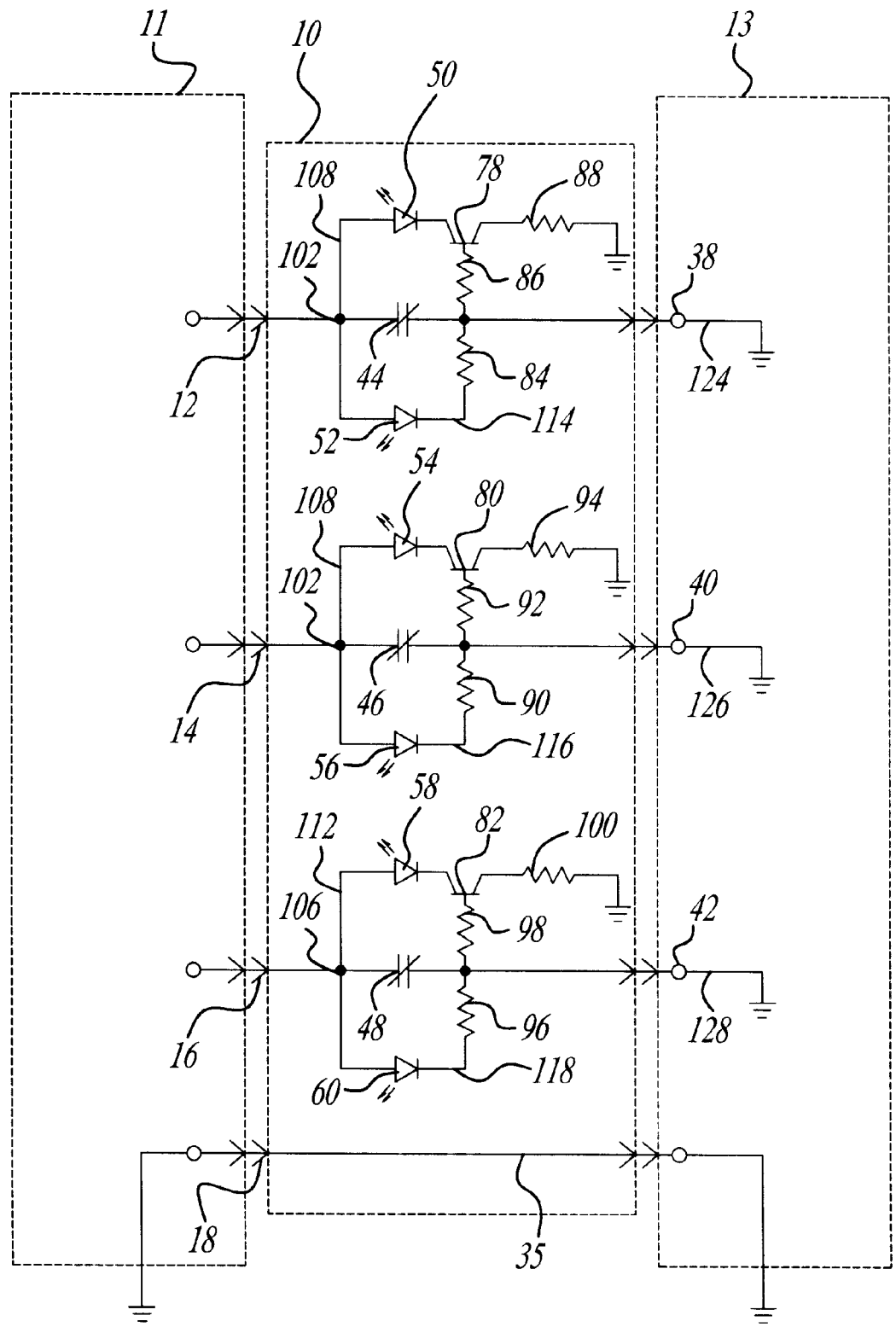

These and other objects, features and advantages of this invention will be apparent from the following detailed description of the preferred embodiment(s) and best mode, appended claims, and accompanying drawings in which:

FIG. 2 is a schematic diagram of electrical components of a trailer plug device constructed according to the invention and connecting a tow vehicle electrical system to a trailer electrical system;

FIG. 1 is a perspective view of a trailer plug device constructed according to the invention shown disconnected from a tow vehicle plug, the trailer plug device including the electrical components diagrammed in FIG. 2; and FIG. 3 is a perspective view of a trailer plug device constructed according to a second embodiment of the invention and shown unplugged from and between a tow vehicle plug and a conventional trailer plug.

DETAILED DESCRIPTION

A first embodiment of an electrical trailer plug device 10 for connecting a trailer electrical system to a tow vehicle electrical system is generally shown at 10 in FIG. 1. A second embodiment is generally indicated at 10' in FIG. 3. Reference numerals with the designation prime (') in FIG. 3 indicate alternative configurations of elements that also appear in the first embodiment. Unless indicated otherwise, where a portion of the following description uses a reference numeral to refer to the figures, I intend that portion of the description to apply equally to elements designated by primed numerals in FIG. 3. Tow vehicle and trailer electrical systems are schematically represented at 11 and 13, respectively in FIG. 2.

The trailer plug device 10 comprises four electrical connectors, shown at 12, 14, 16 and 18 in FIGS. 1 and 2. The connectors 12, 14, 16, 18 are configured to connect four electrical wires 20, 22, 24, 26 of the trailer electrical system 13 to four corresponding electrical wires of the tow vehicle electrical system 11 (shown at 28, 30, 32, 34 in FIG. 3 with regard to the second embodiment). A ground connector 18 of the four connectors 12, 14, 16, 18 connects respective ground wires 34, 26 of the vehicle and trailer electrical systems 11, 13 that serve as a common ground 35. When plugged into a tow vehicle plug, such as the plug generally indicated at 36 in FIG. 3, the three remaining connectors 12, 14, 16 complete three electrical circuits through the common ground to supply electricity from the vehicle electrical system to four trailer lamps 38, 40, 42 supported on the trailer. A first of these three circuits provides power to a right turn signal mounted on the trailer and represented by node 38 in FIG. 2. A second of the three circuits provides power to a left turn signal mounted on the trailer and represented by node 40 in FIG. 2. The third circuit powers left and right taillights that are mounted on the trailer and are represented by node 42 in FIG. 2.

Circuit protection devices 44, 46, 48 in the form of a circuit breaker or fuse is connected in each of the three circuits between the connectors 12, 14, 16, 18 and the lamps 38, 40, 42 connected in the respective circuits as shown in FIG. 2. The circuit protection devices 44, 46, 48 are each configured to limit current flow in their respective circuits when current flow exceeds a predetermined value. Each circuit includes two sensor lights 50, 52; 54, 56; 58, 60 and a combination of circuit elements that cause the first sensor light 50, 54, 58 in each circuit to illuminate when current in that circuit is flowing but has not exceeded the predetermined value. The combination of circuit elements in each circuit also causes the second sensor light 52, 56, 60 in each circuit to illuminate when the circuit protection device 44, 46, 48 in the circuit is limiting current flow in response to a fault in the circuit. In each circuit, both sensor lights 50, 52; 54, 56; 58, 60 are extinguished when the circuit is unpowered. All the above components are encased in a trailer plug body or housing generally indicated at 62 in FIG. 1.

Each sensor light 50, 52; 54, 56; 58, 60 includes a monochromatic light source that is configured to emit a visible band of electromagnetic energy. The visible light band that the monochromatic light source of the first sensor light 50, 54, 58 in each circuit emits is in the green portion of the visible spectrum. The visible light band that the monochromatic light source of the second sensor light 52, 56, 60 in each circuit emits is in the red portion of the visible spectrum.

The two sensor lights 50, 52; 54, 56; 58, 60 in each circuit are included in a single common-anode bi-color light-emitting diode (LED) shown at 64, 66 and 68 in FIG. 1. Each monochromatic light source includes a tiny chip that generates a very narrow band of electromagnetic energy in the visible spectrum, i.e., colored light. The two chips in each bi-color LED 64, 66, 68 are encased in a translucent lens made of an epoxy resin. The translucent lens may also be colored. Bi-color LED's of this type are available from Luminex under the trade name Luminex-Lites® in a variety of chip and lens color combinations. The three bi-color LED's 64, 66, 68 of each plug device 10 are encased in a block 70 of translucent material such as Lucite® cast acrylic. The block 70 of clear material containing the LED's 64, 66, 68, the connectors 12, 14, 16, 18 and the circuit protection device 44, 46, 48 are encased in a plastic casing 74 of the trailer plug body 62. One surface 72 of block 70 of clear material containing the LED's 64, 66, 68 is left exposed through an outer wall of the plastic casing 74 so that the illumination of the LED's 64, 66, 68 can be observed.

The circuit protection devices 44, 46, 48 included in the circuits are configured to automatically reset by closing their respective circuits once a fault that caused a high current condition has been cleared and electrical power is removed from the affected circuit. Each circuit protection device 44, 46, 48 is a polymeric positive temperature coefficient resettable fuse (PTC device) that uses conductive-polymer technology to limits the flow of dangerously high current during fault conditions in the circuit. PTC devices are solid-state devices configured to reset after a fault is cleared and power to the circuit is removed. PTC devices are available from Raychem Corporation under the trade name PolySwitch®.

The combination of circuit elements that controls illumination of the first and second sensor lights in each circuit also limits current through the sensor lights 50, 52; 54, 56; 58, 60 to a level that prevents the lights from burning out. As shown in FIG. 2, the combination of circuit elements in each circuit includes respective circuit protection devices 44, 46, 48; respective transistors 78, 80, 82 and respective first resistors 84, 86, 88; second resistors 90, 92, 94; and third resistors 96, 98, 100. The second sensor light 52, 56, 60 in each respective circuit includes two leads, one lead being connected into the circuit in series with the respective first resistor 84, 90, 96 at a respective common anode 102, 104, 106 disposed between the respective circuit protection device 44, 46, 48 and the trailer electrical system 13. The other lead of the second sensor light 52, 56, 60 is connected into the circuit at a point between the respective connector 12, 14, 16 and the respective circuit protection device 44, 46, 48. The respective first sensor light 50, 54, 58 in each circuit also includes two leads, one lead being connected in the circuit at the respective common anode 102, 104, 106 (between the respective connector 12, 14, 16 and the respective circuit protection device 44, 46, 48) and the other lead being connected to an input of the respective transistor 78, 80, 82. An output of the respective transistor 78, 80, 82 is connected to ground through the respective third resistor 88, 94, 100. The base of the respective transistor 78, 80, 82 is connected into the circuit through the respective second resistor (base resistor) 86, 92, 98, connecting into the circuit between the respective circuit protection device 44, 46, 48 and the trailer electrical system 13. The respective first and third resistors 84, 90, 96; 88, 94, 100 in each circuit are included to limit current flow through the respective first and second sensor light portions 50, 54, 58; 52, 56, 60 of the LED 64, 66, 68 in that circuit.

The transistor 78, 80, 82 in each of the three circuits is configured to turn on through the base resistor 86, 92, 98 when the circuit protection device 44, 46, 48 in that circuit is closed (normal condition) and current is flowing in the circuit. When the transistor 78, 80, 82 in any of the three circuits is on, current is conducted along a primary path 108, 110, 112 through the green light source 50, 54, 58 of the LED 64, 66, 68 in that circuit, through the transistor 78, 80, 82 and the third resistor 88, 94, 100 to ground, causing the green light source 50, 54, 58 of the LED 64, 66, 68 in that circuit to illuminate. If an overload condition occurs in a trailer portion of one of the circuits, schematically represented at 13 in FIG. 1, the PTC in that circuit will open, stopping current flow to the trailer portion of the circuits 13 and to the base of the transistor 78, 80, 82 in that circuit which causes the transistor 78, 80, 82 to shut down. When the transistor 78, 80, 82 shuts down the green light source 50, 54, 58 of the LED 64, 66, 68 in that circuit will turn off and current will flow, instead, along a secondary path 114, 116, 118 through the red light source 52, 56, 60 of the LED 64, 66, 68 and the first resistor 84, 90, 96, grounding through the overloaded trailer portion 13 of the circuit and causing the red light source 52, 56, 60 of the LED 64, 66, 68 to illuminate. If there is no input voltage at the common anode 102, 104, 106 of the LED 64, 66, 68 in a given one of the three circuits, or if an open condition exists in a tow vehicle portion of that circuit (schematically shown at 11 in FIG. 2), neither light source of the LED 64, 66, 68 will illuminate. This logic is identical in each of the three circuits. However, the three circuits differ in that the PTCs in the first and second circuits (the turn signal circuits) are configured for 4 amps while the PTC in the third circuit (the tail light circuit) is configured for 5 amps.

As shown in FIG. 1, the trailer plug device 10 has a first end 120 configured to removably connect, both mechanically and electrically, to a complementary end of the vehicle plug 36, and a second end 122 configured to connect, both mechanically and electrically, to the electrical wires 20, 22, 24, 26 of the trailer electrical system 13.

The trailer plug device 10 includes four electrical connectors 12, 14, 16, 18, the first connector 12 of which is connected to a current path or wire 20 that extends and connects to the right turn signal light. A second connector 14 of the four connectors is connected to a current path or wire 22 that extends and connects to the left turn signal light. A third connector 16 of the four connectors is connected to a current path or wire 24 that extends and connects to both the left and right taillights. The fourth connector 18 is configured to connect to a trailer chassis ground wire 26 that connects through the trailer chassis to chassis ground leads 124, 126, 128 from each light 38, 40, 42.

As shown in FIG. 1, the first, second and third of the four connectors 12, 14, 16, 18 of the trailer plug device 10 are generally cylindrical female connectors and the fourth connector 18 is a contoured probe-shaped male connector. The trailer plug connectors 12, 14, 16, 18 are configured to complement a tow vehicle plug 36 that includes one female connector 130 and three male connectors 132, 134, 136. The three male connectors 132, 134, 136 of the tow vehicle plug 36 are shaped to be received by an interference fit into the female connectors 12, 14, 16 of the trailer plug device 62. The male connector of the trailer plug device 62 is shaped to be received by an interference fit into the female connector 130 of the tow vehicle plug 36.

The four trailer plug connectors 12, 14, 16, 18 are encased in a parallel coplanar disposition in the plastic casing 74. The portion of the casing 74 defining the first end 120 of the trailer plug device 10 is shaped to complement the shape of one end of the tow vehicle plug 36 through which the tow vehicle plug connectors 130, 132, 134, 136 are exposed. When joined together, the trailer and vehicle plugs 10, 36 connect tow vehicle electrical system wires 28, 30, 32, 34 to the trailer electrical system 13 to transmit power from vehicle lighting circuits to the trailer electrical system 13 to illuminate the trailer lights 38, 40, 42. The shape of the trailer plug device 10 and the shape of the vehicle plug 36 are conventional shapes in the industry also known as a "four-flat" configuration. The "four-flat" trailer wiring plug is configured to plug into any complementary-shaped vehicle electrical plug such as the tow vehicle plug shown at 36 in FIG. 1.

According to this convention, the single male trailer plug connector 18 of the trailer plug device 10 and the one female vehicle plug connector 130 of the tow vehicle plug 36 are the common chassis ground connection. The other three pairs of connectors are, in order from the ground connectors, the tail light connectors 16, 132, the left turn signal light connectors 14, 134 and the right turn signal light connectors 12, 136. This convention insures that the correct contacts are made between tail light and turn signal light circuits whenever a trailer electrical system 13 configured according to the convention is connected to a tow vehicle electrical system 1 that is also configured according to the convention.

As shown in FIG. 3, according to the second embodiment of the device, the second end 122' of the trailer plug device 10' is disposed opposite the first end 120' of the trailer plug device 10' and is configured to removably connect, both mechanically and electrically, to a complementary conventional trailer plug, generally indicated at 140 in FIG. 3. The conventional trailer plug 140 is connected to the trailer electrical system 13 by four trailer plug wires 20', 22', 24', 26'. The portion of the casing 74' defining the second end 122' of the trailer plug device 10' is shaped to complement the shape of one end 142 of the conventional trailer plug 140 through which connectors 144, 146, 148, 150 of the conventional trailer plug 140 are exposed. As with the tow vehicle plug 36 and the inventive trailer plug device 10', the shape of the conventional trailer plug 140 conforms to the conventional "four-flat" configuration. The second end 122' of the inventive trailer plug device 10' includes three male connectors 152, 154, 156 that plug into three female connectors 142, 144, 146 of the conventional trailer plug 140 to make tail light and turn signal light circuit connections, respectively. The second end 122' of the inventive trailer plug device 10' also includes a single female connector 158 that receives a single male connector 158 of the conventional trailer plug 140 to make the common ground connection for all three circuits.

Other embodiments of the trailer plug device 10 may include more or fewer than four connectors to close more or fewer than three circuits. Any number of the circuits may include the circuit components described above including circuit protection devices, sensor lights, transistors and resistors. In other embodiments the monochromatic light sources of the first and second sensor lights in each circuit may be configured to emit visible light bands from other than the green and red portions of the spectrum, so long as the bands emitted by the respective sensor lights are visually differentiable from each other. The respective sensor lights may be visually differentiable by, for example, emitting respective light beams that are different in color, pattern and/or intensity. The various current paths described above could be defined by elongated conductors other than wires, e.g., flex cables, circuit board traces etc.

An electrical trailer plug device 10 constructed according to either the first or the second embodiment of the invention may be fabricated by encasing the bi-color LED's 64, 66, 68 in the block 70 of clear or translucent cast acrylic. The above-described connectors 12, 14, 16, 18, circuit protection devices 44, 46, 48, bi-color LED's 64, 66, 68, transistors 78, 80, 82 and resistors are then electrically connected together as described above. The connectors 12, 14, 16, 18, circuit protection devices 44, 46, 48, acrylic-encased bi-color LED's 64, 66, 68 and the other circuit components are then encased in the plastic casing 74 of the trailer plug body 62. As described above, the plastic casing 74 of the trailer plug body 62 is cast around the components so that one surface 72 of the acrylic block 70 containing the LED's 64, 66, 68 and appropriate portions of the electrical connectors 12, 14, 16, 18 are left exposed through an outer wall 160 of the plastic casing 74. The connectors 12, 14, 16, 18 are left exposed to allow electrical contact to be made with the connectors 130, 132, 134, 136 of a tow vehicle plug 36 and the acrylic block 70 is left exposed to allow the illumination (or lack of illumination) of the LED's 64, 66, 68 to be observed.

According to the first embodiment of the invention, the tail light wire 32, the two turn-signal wires 28, 30 and the ground wire 34 from the trailer electrical system 13 are also connected to the trailer plug device components before encasing the components within the plastic casing 74 of trailer plug device 10. More specifically, the ground wire 34 is connected to the ground connector 18. The tail light and turn signal wires 28, 30, 32 are connected to the three circuit protection devices 44, 46, 48 that are connected to the respective tail light and turn signal connectors 12, 14, 16; i.e., the first, second and third electrical connectors 12, 14, 16 of the trailer plug device 10.

According to the second embodiment of the invention shown in FIG. 3, the trailer plug device 10' is connected to the tow vehicle electrical system 11 by plugging the second end 122' of the inventive trailer plug device 10' into the conventional trailer plug 140 that is wired to the trailer electrical system 13.

Both the first and the second embodiments of the invention prevent damage to tow vehicle electrical systems from faults in trailer electrical systems while providing a quick and easy way for an operator to confirm proper operation of a trailer electrical system and to trouble-shoot improper operation.

I intend this description to illustrate certain embodiments of the invention rather than to limit the invention. Therefore, I have used descriptive words rather than limiting words.

Obviously, it's possible to modify this invention from what the description teaches. Within the scope of the claims, one may practice the invention other than as described.

We claim:

1. An electrical trailer plug device for connecting a trailer electrical system to a tow vehicle electrical system; the trailer plug device comprising:

an electrical connector configured to connect a vehicle electrical system current path to a trailer electrical system current path, the connected current paths completing an electrical circuit for supplying electricity from the vehicle electrical system to one or more trailer lamps connected to the trailer electrical system;

a current protection device connected in the circuit and configured to limit current in the circuit to no greater than a predetermined value;

a first sensor light connected to the circuit; and a combination of circuit elements connected in the circuit and configured to illuminate the first sensor light when current is flowing in the circuit but has not exceeded the predetermined value;

the first sensor light including two leads, one lead being connected to the current path at a point between the connector and the circuit protection device and the other lead being connected to the input of a transistor;

the output of the transistor connected to ground;

the base of the transistor connected to the current path between the circuit protection device and the trailer electrical system;

the second sensor light including two leads, one lead being connected to the current path at a point between the circuit protection device and the trailer electrical system and the other lead being connected to the current path at a point between the connector and the circuit protection device; and the transistor being configured to turn on when the circuit protection device is closed and current is flowing in the current path.

2. An electrical trailer plug device as defined in claim 1 and in which:

the sensor light is a monochromatic light source configured to emit electromagnetic energy in a visible portion of the electromagnetic spectrum;

the trailer plug device includes a second sensor light comprising a monochromatic light source configured to emit electromagnetic energy in a visible portion of the electromagnetic spectrum visually differentiable from that of the first sensor light; and the combination of circuit elements is configured to illuminate the second sensor light when the circuit protection device is limiting current flow in the circuit in response to a fault in the circuit.

3. An electrical trailer plug device as defined in claim 2 and further including a bi-color light-emitting diode comprising the two sensor lights.

4. An electrical trailer plug device as defined in claim 2 in which a bi-color light-emitting diode is encased in a clear lens.

5. An electrical trailer plug device as defined in claim 4 in which the block of clear material, the connector and the circuit protection device are encased in a plastic plug casing, at least a portion of the clear lens being exposed through an outer wall of the plug casing.

6. An electrical trailer plug device as defined in claim 1 in which the circuit protection device is configured to automatically reset once a fault that caused the high current condition has been cleared.

7. An electrical trailer plug device as defined in claim 6 in which the circuit protection device comprises a polymeric positive temperature coefficient resettable fuse.

8. An electrical trailer plug device as defined in claim 1 in which:
  the output of the transistor is connected to ground through a resistor; and
  the second sensor light is connected in series with a resistor to the current path at a point between the circuit protection device and the trailer electrical system.

9. An electrical trailer plug device as defined in claim 1 and further including:
  a trailer plug body supporting the connector, circuit protection device and sensor light, and
  the trailer plug device having:
    a first end configured to removably connect, both mechanically and electrically, to a complementary vehicle plug connected to the vehicle electrical system; and
    a second end configured to connect, both mechanically and electrically, to the trailer electrical system.

10. An electrical trailer plug device as defined in claim 9 in which the second end is configured to removably connect, both mechanically and electrically, to a complementary trailer plug connected to the trailer electrical.

11. An electrical trailer plug device as defined in claim 1 in which:
  the device includes three additional connectors configured to connect respective vehicle electrical system current paths to respective trailer electrical system current paths, the connected current paths completing respective electrical circuits for supplying electricity from the vehicle electrical system to trailer lamps connected to the trailer electrical system;
  a first one of the four connectors is connected to a current path that extends and connects to a right turn signal light;
  a second one of the four connectors is connected to a current path that extends and connects to a left turn signal light;
  a third one of the four connectors is connected to a current path that extends and connects to both a left and a right tail light; and
  a fourth of the four electrical connectors is configured to connect to a trailer chassis ground wire that connects to a trailer chassis.

12. An electrical trailer plug device as defined in claim 11 in which the four connectors of the trailer plug include one female and three male connectors.

13. An electrical trailer plug device as defined in claim 12 in which:
  the one female trailer plug connector and the one male vehicle plug connector are the common chassis ground connection; and
  the other three connectors are the tail light connectors and the left and right turn signal light connectors.

14. An electrical trailer plug device as defined in claim 12 in which a bi-color light-emitting diode comprises the first and second sensor lights.

15. An electrical trailer plug device as defined in claim 11 in which the trailer plug body includes a plastic casing; and
  the four connectors are encased in a parallel disposition in the plastic casing.

* * * * *